United States Patent [19]
Melby et al.

[11] 4,423,193
[45] Dec. 27, 1983

[54] DEHYDROCHLORINATION OF VINYL CHLORIDE RESINS FOLLOWED BY GRAFT COPOLYMERIZATION WITH COPOLYMERIZABLE MONOMERS

[75] Inventors: Earl G. Melby, Uniontown; Harry W. Cocain, Cuyahoga Falls; Hubert J. Fabris, Akron, all of Ohio

[73] Assignee: The General Tire & Rubber Company, Akron, Ohio

[21] Appl. No.: 414,090

[22] Filed: Sep. 1, 1982

Related U.S. Application Data

[63] Continuation of Ser. No. 287,462, Jul. 27, 1981, abandoned.

[51] Int. Cl.³ ............................. C08F 6/00; C08F 8/26; C08F 263/04; C08F 259/02
[52] U.S. Cl. .................... 525/296; 525/242; 525/309; 525/313; 525/331.5; 525/340; 525/366; 525/367
[58] Field of Search ............... 525/331.5, 367, 340, 525/296, 242, 309, 313, 316

[56] References Cited

U.S. PATENT DOCUMENTS

| | | | |
|---|---|---|---|
| 2,908,662 | 10/1959 | Rees | 525/273 |
| 2,982,760 | 5/1961 | Maragliano | 528/499 |
| 3,576,914 | 4/1971 | Donat | 525/263 |
| 3,826,789 | 7/1974 | Yokokawa | 525/378 |
| 3,919,131 | 11/1975 | Malatesta | 525/367 |

OTHER PUBLICATIONS

Ostensson and Flodin, J. Macromol, Sci.–Chem., A12(2), 249–260, (1978).
Roth, Rempp, Barrod, J. Polym. Sci., 58, 1311, (1962).

*Primary Examiner*—C. A. Henderson

[57] ABSTRACT

Vinylchloride resins such as polyvinylchloride, copolymers of vinylchloride and vinyl acetate and copolymers of vinylchloride and vinylidene chloride are dehydrochlorinated in water at 150° to 180° C. to provide a dehydrochlorinated vinylchloride resin which can be graft copolymerized with one or more copolymerizable monomers containing polymerizable ethylenically unsaturated double bonds. Grafted copolymers in which the grafting monomer is butyl acrylate and the like provide an internally plasticized vinylchloride resin.

8 Claims, No Drawings

DEHYDROCHLORINATION OF VINYL CHLORIDE RESINS FOLLOWED BY GRAFT COPOLYMERIZATION WITH COPOLYMERIZABLE MONOMERS

This application is a continuation of Ser. No. 287,462, filed July 27, 1981, now abandoned.

The present invention relates to the dehydrochlorination of vinylchloride resins such as poly(vinylchloride).

BACKGROUND OF THE INVENTION

Preparation of graft copolymers of poly(vinyl chloride) using free radical grafting techniques is inefficient in that only low amounts of the grafting monomers become chemically attached as grafted polymer to the poly(vinyl chloride) backbone. Compositions resulting from these grafting reactions contain large amounts of ungrafted polymers which are usually incompatible with poly(vinyl chloride). Consequently, the materials have poor physical, optical and processing properties. The main reason for the grafting inefficiency is the low reactivity of the poly(vinyl chloride) towards attack by either initiator or polymer free radicals.

It is known in the literature[1,2,3] that much higher grafting efficiencies can be obtained by using a poly(vinyl chloride) backbone that has been partially dehydrochlorinated. Partially dehydrochlorinated poly(vinyl chloride) contains unsaturated sequences (polyenes) which are quite susceptible to attack by free radicals.

Various techniques have been described for preparing partially dehydrochlorinated poly(vinyl chloride)[4]. Chemical methods [treatment of poly(vinyl chloride) with bases such as potassium hydroxide or ammonia] are normally carried out with the poly(vinyl chloride) dissolved in a solvent such as tetrahydrofuran in order to get uniform dehydrochlorination[1,3,5]. Uniform dehydrochlorination can also be achieved by heating a solution of poly(vinyl chloride) in a high boiling solvent such as ethyl benzoate at temperatures above 160° C.[6]. Solution techniques are very cumbersome, however, since only dilute solutions (5% by weight) can be used and the resultant dehydrochlorinated poly(vinyl chloride) must be recovered from the solvent by evaporation or precipitation.

Base catalyzed dehydrochlorination of solid poly(vinyl chloride) occurs mainly on the particle surface and there is a strong tendency towards gel formation. More uniform dehydrochlorination of solid poly(vinyl chloride) results from a pure thermal process. To obtain uniform dehydrochlorination on dry, solid resins, the resin particles must be heated and circulated with an inert gas as in a fluidized bed[7]. Alternatively, fluids such as ethylene glycol, paraffin oil or maleic anhydride have been used as media in which the resin particles can be circulated to provide uniform heat transfer[2,8]. Poly(vinyl chloride) has been dehydrochlorinated in dimethylformamide solution containing lithium chloride[9]. Poly(vinyl chloride) has been dehydrochlorinated and sulfonated by treatment in sulfuric acid[10]. The dehydrochlorinated poly(vinyl chloride), however, must be isolated from these fluids prior to free radical grafting, and the heat transfer fluids have to be purified before being recirculated. Polyvinyl chloride has been treated in aqueous caustic at 180° to 300° C. to obtain a high m.w. polymer composed mostly of carbon, hydrogen and oxygen with traces of nitrogen and chlorine being present[11].

OBJECTS

An object of this invention is to avoid the difficulties alluded to before and to provide a novel and simple process for the dehydrochlorination of a vinylchloride resin and the product of such process.

Another object of this invention is to provide graft polymers of dehydrochlorinated vinylchloride resins.

These and other objects and advantages of the present invention will become more apparent to those skilled in the art from the following detailed description and working examples.

SUMMARY OF THE INVENTION

This invention offers a method in which a suspension of vinylchloride resin can be dehydrochlorinated in the same media (water) in which the free radical grafting can be subsequently performed. A suspension of the vinylchloride resin in water is heated in a closed vessel from about 50 to 120 psi at from about 150° to 180° C. for from about 1 to 2 hours. Porous vinylchloride resins are preferred, although the techniques have been applied to non-porous resins. During this heating, the vinylchloride resin becomes partially dehydrochlorinated (not over about 3% chlorine loss by weight). From about 1 to 2% by weight chlorine loss is preferred for use in making the graft copolymers described herein. With higher levels of chlorine loss in this process, there is a tendency for gel formation and increased color in the subsequent graft copolymers. With chlorine losses above 5% by weight, the resultant dehydrochlorinated vinylchloride resin itself tends to become crosslinked.

The graft copolymers are produced by reacting the dehydrochlorinated vinylchloride resin with monomers and free radical initiators in an aqueous suspension process. The grafted product is in the form of free-flowing particles which can be recovered by filtration or centrifugation. This method also offers the possibility of using the aqueous suspension for dehydrochlorination and grafting obtained originally by polymerizing the vinylchloride resin by a suspension polymerization process. The resultant graft copolymer can thus be produced directly in the same aqueous media and vessel in which the vinyl chloride is polymerized provided there are no inhibitors, short stops or catalysts residues present which might interfere with the subsequent graft polymerization or copolymerization. This will save the steps required in isolating the vinylchloride resin. In addition, unlike the techniques described in the previous literature, no solvents or other organic media are required for the dehydrochlorination.

During the dehydrochlorination in water there is a tendency for the dehydrochlorinated vinylchloride resin to agglomerate, possibly due to the development of electrostatic charges. It has been found that this agglomeration preferably can be avoided by carrying out the dehydrochlorination in a dilute electrolyte (e.g. sodium chloride, sodium iodide) solution. Free-flowing particles of partially dehydrochlorinated vinylchloride resin, thus, can be obtained. Alternatively, it is possible to introduce weak bases (e.g. sodium carbonate, trisodium phosphate) to capture the hydrogen chloride evolved during dehydrochlorination. Also, the acid in the water may be neutralized with NaOH or other alkaline solutions.

When monomers such as acrylates are grafted to the partially dehydrochlorinated poly(vinyl chloride), there is a significant increase in the grafting efficiency (% acrylate grafted to the vinylchloride resin) compared to compositions obtained from unmodified vinylchloride resins. The high level of grafting results in increased compatibility and significant improvement in the physical, optical and processing properties of the resin. If monomers with a low glass transition temperature (such as acrylates) are grafted to the partially dehydrochlorinated vinylchloride resin, internally plasticized vinylchloride resin compositions result. These compositions are useful in making films and coated fabrics and can be calendered, molded or extruded into various flexible products such as in covers for arm rests, seats, chairs and so forth.

DISCUSSION OF DETAILS AND PREFERRED EMBODIMENTS

The vinylchloride polymer or resin to be dehydrochlorinated is homopolyvinylchloride, vinylchloride-vinyl acetate copolymer containing up to about 50% by weight of vinyl acetate, and vinylchloride-vinylidene chloride copolymer containing up to about 50% by weight of vinylidene chloride and mixtures of the same. These polymers are made by the suspension polymerization process. Suspension polymerization is well known as shown by Schildknecht. "Vinyl and Related Polymers," 1952, John Wiley & Sons, Inc., New York. See, also, "Modern Plastics Encyclopedia," October, 1980, Volume 57, Number 10A, McGraw-Hill Co. Inc., New York, pages 104, 108 and 110. These suspension polymers are obtained as finely divided particles or solids. The preferred vinylchloride resin to use is poly(-vinylchloride).

Sufficient water is used during dehydrochlorination to suspend the particles of the vinylchloride resin. Generally, there may be used a suspension of from about 15 to 50% by weight solids of the vinyl chloride resin in water, preferably about 25% solids of the vinyl chloride resin in water.

The water soluble solid electrolyte (a substance which dissociates into two or more ions) or salt used to prevent agglomeration can be a water soluble halide salt of an alkali metal or alkaline earth metal such as a lithium, sodium, potassium, magnesium, calcium, strontium or barium bromide, chloride or iodide salt or mixture thereof. Examples of such salts are lithium chloride, lithium iodide, sodium chloride, sodium bromide, sodium iodide, potassium bromide, magnesium chloride, calcium bromide, calcium iodide, barium chloride, barium iodide, strontium chloride and strontium bromide. Sodium chloride is the preferred salt to use.

Still other water soluble electrolytes can be used such as ammonium chloride, sodium acetate, potassium acetate, lithium acetate, magnesium acetate and so forth.

The weak base (a base that does not ionize greatly) used to prevent agglomeration can be an alkali metal carbonate or phosphate like sodium carbonate, trisodium phosphate, lithium carbonate, lithium phosphate, potassium carbonate, or potassium phosphate or other water soluble solid weak base or mixture thereof.

On a dry weight basis the electrolyte or weak base is used in a very minor amount by weight as compared to the vinyl chloride resin and sufficient to prevent agglomeration during dehydrochlorination of the vinyl chloride resin. Preferably, the electrolyte or weak base is used in an amount of from about 0.1 to 5.0 parts by weight per 100 parts by weight of the vinyl chloride resin.

After dehydrochlorination the vinylchloride resin in water may be filtered or centrifuged to remove the water, washed and then resuspended in water to permit graft polymerization. Since the water in which the vinyl chloride resin is mixed usually contains not more than about 0.1 mole of acid, it may be used as the graft polymerization or copolymerization medium provided the monomers used are not affected adversely.

The technique of polymerizing or copolymerizing one or more monomers in the presence of a polymer or a substrate, "grafting technique," is known and is frequently called graft polymerization or graft copolymerization. In this connection, please see "Proceedings Of The Third Rubber Technology Congress," 1954, W. Heffer & Sons, Ltd., Cambridge, pages 185-195; "Copolymerization," High Polymers, Vol. XVIII, Ham, Interscience Publishers a division of John Wiley & Sons, New York, 1964; "Block and Graft Polymers," Burlant and Hoffman, Reinhold Publishing Corporation, New York, 1960; "Block and Graft Copolymers," Ceresa, Butterworth & Co. (Publishers) Ltd., London, 1962; Ceresa, "Block and Graft Copolymerization," Vol. 1 (1973) and Vol. 2 (1976), John Wiley & Sons, Ltd., New York; and "Graft Copolymers," Polymer Reviews, Vol. 16, Battaerd and Tregear, Interscience Publishers, a division of John Wiley & Sons, New York, 1967. See, also, U.S. Pat. Nos. 3,180,908 and 3,519,702. The graft copolymer may contain all graft copolymer but also may be a mixture of homopolymers, copolymers as well as the graft itself, depending on the rate of polymerization of the monomers under the polymerization conditions and so forth.

Examples of monomers which may be graft polymerized or copolymerized with the dehydrochlorinated vinylchloride resin are those monomers containing polymerizable ethylenically unsaturated double bonds such as the amides like acrylamide, methacrylamide and N-hydroxymethyl acrylamide; the nitriles like acrylonitrile and methacrylonitrile; the acrylates and alkacrylates like methyl acrylate, ethyl acrylate, butyl acrylate, ethyl hexyl acrylate, octyl acrylate, hydroxy ethyl acrylate, hydroxy propyl acrylate, methyl methacrylate, ethyl methacrylate, butyl methacrylate, methyl ethacrylate, ethyl ethacrylate, butyl ethacrylate and octyl ethacrylate; the dienes such as butadiene-1,3, chloroprene, 2,3-dimethyl butadiene-1,3, piperylene and isoprene; and the vinyl benzenes like styrene, alpha methyl styrene, p-tertiary butyl styrene, methyl vinyl toluene and para vinyl toluene and the like and mixtures of the same.

When graft copolymerizing a hard monomer like styrene, it is desired to include with the styrene a sufficient amount of a soft monomer like butyl acrylate or butadiene to act as a plasticizer. Also, comonomers like acrylonitrile may improve homogeniety and compatibility in the resulting resin. Even though both acrylonitrile and methacrylonitrile can be used in these graft copolymers, it has been found that the latter has less tendency to yellow. The parts by weight ratio of the soft monomer to the hard monomer may be from about 2:1 to 20:1.

It is particularly desirable to use mixtures of nitriles and acrylates which can form polyacrylates having a low Tg such as on the one hand acrylonitrile or methacrylonitrile and on the other hand an acrylate or methacrylate monomer which could form an acrylate polymer having a Tg (glass transition temperature) of not above about −20° C. Examples of such acrylate monomers are ethyl acrylate, n-propyl acrylate, n-butyl acrylate, hexyl acrylate, octyl acrylate, 2-ethyl hexyl acrylate, decyl acrylate, methoxy ethyl acrylate, ethoxy ethyl acrylate, methoxy propyl acrylate and ethoxy propyl acrylate and the like. These monomers, thus, have the general formula $CH_2=CH-COOR$ where R is an alkyl group of 2 to 10 carbon atoms or a $-R'OR''$ group where $R'$ is an alkylene group of 2 to 3 carbon atoms and $R''$ is an alkyl group of 1 to 2 carbon atoms. It will be noted that poly(n-butyl acrylate) has a Tg of $-55°$ C. and poly(2-ethyl hexyl acrylate) has a Tg of $-77°$ C. Also, there may be used as the acrylate monomer, monomers having the formula $H_2C=C(CH_3)COOR'''$ where $R'''$ is an alkyl group of 8 to 18 carbon atoms such as n-octyl methacrylate, n-dodecyl methacrylate, hexadecyl methacrylate and n-octadecyl methacrylate and the like. Poly(n-octyl methacrylate) has a Tg of $-20°$ C. and poly(n-octadecyl methacrylate) has a Tg of $-100°$ C. Mixtures of these acrylate monomers may be used. However, the higher molecular weight acrylate and methacrylate monomers are less compatible (phase separation) with polyvinyl chloride. Thus, the higher molecular weight acrylate and methacrylate monomers should be used in mixtures, in amounts up to 25% by weight of the mixture, with a lower molecular weight acrylate like ethyl, propyl and/or butyl acrylate. Of these acrylate monomers it is preferred to use n-butyl acrylate.

Overall in the graft polymerization process there can be used from about 50 to 200 parts by weight of the grafting monomer or monomer mixture per 100 parts by weight of the dehydrochlorinated vinylchloride resin.

Graft polymerization should be conducted in a closed reactor, such as a pressure reactor, fitted with a stirrer or other agitating means, heating and cooling means, with means to flush with or pump in an inert gas such as nitrogen, helium, argon, neon and the like in order to polymerize preferably under controlled, inert or non-reactive conditions, with means to charge the resin (if previously separated), monomers, water, initiators and so forth, venting means, and with means to recover the graft polymer and so forth. The reactor should be cleaned or flushed out between polymerization runs to remove traces of initiators, modifier, colloids, residues and the like which might interfere with subsequent polymerizations. There should be sufficient agitation or stirring of the polymerization media to ensure thorough mixing, diffusion, contact and so forth. All of the polymerization ingredients may be charged to the reactor at the same time, intermittently, incrementally or continuously. Also, the ingredients may be added separately or in a mixture.

Temperatures used during graft polymerization should be sufficient to effect polymerization by activation of the initiator and double bonds of the monomers. They should not be too high to cause a run-away reaction and not too low to retard polymerization. In general, the temperature may be from about 2° to 90° C. If even lower temperatures are used, it may be desirable to add an inert anti-freeze material to the polymerization media. Water is used in an amount sufficient to obtain the desired degree of suspension or dispersion, cooling, mixing, solids content and so forth.

Graft polymerization of the monomers is effected by free-radical initiators (free-radical formers or free-radical forming systems, catalysts) such as ammonium, potassium or sodium persulfate, $H_2O_2$ and the like in an amount sufficient for polymerization of the monomers. Other free-radical initiators can be used which decompose or become active at the temperature used during polymerization. Examples of some other free-radical initiators are cumene hydroperoxide, dibenzoyl peroxide, diacetyl peroxide, didecanoyl peroxide, di-t-butyl peroxide, dilauroyl peroxide (preferred), bis (p-methoxy benzoyl) peroxide, t-butyl peroxy pivalate, dicumyl peroxide, isopropyl percarbonate, di-sec-butyl peroxybicarbonate, azobisdimethyl-valeronitrile, 2,2'-azobisisobutyronitrile, 2,2'-azobis-2-methylbutyronitrile and 2,2'-azobis (methylisobutyrate) and the like and mixtures of the same. Only minor amounts of initiators are necessary to effect polymerization.

Protective colloids having little surface activity are desirably used in the graft suspension polymerization process to provide finely divided particles suspended in the aqueous medium. Examples of useful protective colloids are copolymers of from 30 to 50% vinyl acetate, balance 1-vinyl-2-pyrrolidone. Other polymers can be used as a colloid such as those obtained by copolymerizing a pyrrolidone, such as 1-vinyl-3-pyrrolidone, or vinyl piperidone, with a copolymerizable monomer like vinyl acetate, acrylic acid, methacrylic acid, butyl acrylate, ethyl acrylate, methyl acrylate, ethyl vinyl ketone, allyl acetone, methyl (5-hexene-2-one) vinyl ether, vinyl isobutyl ether, allyl alcohol, 3-buten-1-ol, and the like and mixtures thereof. Still other protective colloids may be used, for example, gelatin, polyacrylamide, hydroxy ethyl cellulose, hydroxy propyl methyl cellulose (preferred), carboxy methyl cellulose, methyl cellulose, gum arabic, gum tragacanth, low molecular weight polyvinyl alcohols etc. These protective colloids are used in amounts of from about 0.01 to 4.0% by weight, and preferably from about 0.1 to 2% by weight, based on the weight of the graft polymer obtained.

Other materials which may be used during the graft polymerization are chelating or sequestering agents, chain transfer agents or modifiers such as tertiary alkyl mercaptans to prevent or reduce gel, stabilizers, antioxidants and shortstops (to stop the polymerization at the desired conversion and prevent further polymerization during stripping, work-up and so forth). Swelling agents for the dehydrochlorinated resin, also, may be used to facilitate the graft polymerization or copolymerization process.

The following examples will serve to illustrate the present invention with more particularity to those skilled in the art. In these examples the parts are parts by weight unless otherwise noted.

EXAMPLE 1

PVC I (3,000 grams) and ethylene glycol (12 liters) were charged to a 5-gallon stainless steel reactor. The reactor was equipped with a stirrer, electrical strip heaters and a bottom take-off valve. The reactor with its contents were heated to 160° C. over a period of 50 minutes. The wall temperature of the reactor was maintained at 165° C. (which kept the ethylene glycol/PVC I slurry at 160° C.) for 2 hours. The reactor and its contents were cooled to ambient temperature and the ethylene glycol/dehydrochlorinated PVC I slurry was discharged through the bottom valve. The dehydrochlorinated PVC I was recovered by filtration and was washed with water and dried. The dried resin consisted of orange-colored particles and had 55.78% chlorine (original PVC I has 56.73% chlorine). The resin was soluble in tetrahydrofuran and had a series of absorbances in the visible spectrum from 250–600 nm, characteristic of polyene sequences of different lengths (approximately $C_2$ to $C_{12}$).

EXAMPLE 2

The method described in Example 1 was repeated exactly, except that the ethylene glycol was replaced with water (14 liters). The dehydrochlorinated PVC I could not be discharged through the bottom valve but was caked in the upper level of the reactor. This cake was removed, broken up into fine particles, washed with water and dried. The resultant orange-colored resin had 55.70% chlorine and was soluble in tetrahydrofuran. A series of absorbances was found in the visible spectrum from 250–600 nm, characteristic of polyene sequences of different lengths.

EXAMPLE 3

The method described in Example 2 was repeated exactly, except that 75 grams of sodium chloride were added to the water/PVC I mixture. The resultant dehydrochlorinated PVC I flowed freely through the bottom valve of the reactor. The resin was recovered by filtration, washed with water and dried. The resultant dehydrochlorinated PVC I was orange-colored, soluble in tetrahydrofuran and had 56.24% chlorine. The visible spectrum showed a series of absorbances from 250–600 nm, characteristic of polyene sequences of various lengths.

EXAMPLE 4

The method of Example 3 was repeated exactly, except that the temperature of the water/PVC I slurry was kept at 150° C. The resultant dehydrochlorinated PVC I discharged easily from the bottom valve of the reactor. The resin was orange-colored, soluble in tetrahydrofuran and had 56.46% chlorine.

EXAMPLE 5

The method of Example 4 was repeated exactly, except that the temperature of the water/PVC I slurry was kept at 140° C. The dehydrochlorinated PVC I resin that was recovered consisted of small orange particles which were soluble in tetrahydrofuran and had 56.15% chlorine.

EXAMPLE 6

The method of Example 4 was repeated exactly, except that the sodium chloride was replaced with 75 grams of sodium iodide. The dehydrochlorinated PVC I that resulted discharged easily from the bottom valve of the reactor. It was orange-colored, soluble in tetrahydrofuran and had 55.63% chlorine.

EXAMPLE 7

The method of Example 2 was repeated exactly, except that the reactor contents were heated at 155° C. and 10.5 grams of sodium carbonate were added to the slurry. The resultant dehydrochlorinated PVC I discharged easily from the bottom valve of the reactor. It was dark yellow-colored, soluble in tetrahydrofuran and had 55.52% chlorine.

EXAMPLE 8

The method of Example 3 was repeated exactly, except that the poly(vinyl chloride) used was PVC II instead of PVC I. The dehydrochlorinated PVC II discharged easily from the bottom valve of the reactor. It was orange-colored, soluble in tetrahydrofuran and had 56.48% chlorine.

EXAMPLE 9

The method of Example 3 was repeated exactly, except that PVC III was used instead of PVC I. The dehydrochlorinated PVC III discharged easily from the reactor. It was orange-colored, soluble in tetrahydrofuran and had 56.09% chlorine.

EXAMPLE 10

Example 3 was repeated exactly, except that PVC IV was used instead of PVC I. The dehydrochlorinated PVC IV discharged easily from the reactor. It was pale yellow, soluble in tetrahydrofuran and had 56.61% chlorine.

EXAMPLE 11

A mixture of n-butyl acrylate (50 grams), methacrylonitrile (5.25 grams) and "Alperox" F (2 grams) (dilauroyl peroxide, 98%, Pennwalt, Lucidol Chem. Div.) was prepared. This mixture was added to a quart polymerization bottle which contained PVC I (50 grams), water (400 grams) and "Methocel" J 75 HS (0.25 gram) (hydroxy propylmethylcellulose, Dow Chemical Co.). The bottle was capped and placed in a 60° C. polymerization bath. The bottle and its contents were rotated in the bath at 60° C. for 18 hours. The bottle was removed and its contents were poured onto a filter. The filtered product was washed with water and dried. A 99% yield of product was obtained which consisted of small white particles. Five grams of this product were placed in a Soxhlet extraction apparatus and extracted for 36 hours with cyclohexane. The cyclohexane dissolved 1.8 grams of ungrafted, rubbery product which was shown by infrared spectroscopy to consist of a copolymer of butyl acrylate and methacrylonitrile. On this basis, a grafting efficiency (% of the acrylate reacted that became grafted to the PVC I) of 31% was calculated.

EXAMPLE 12

The method of Example 11 was repeated exactly, except that the reaction product of Example 1 was used instead of PVC I. During the grafting reaction, the orange-colored dehydrochlorinated poly(vinyl chloride) was transformed into a product which consisted of small while particles. The grafting efficiency, as determined by cyclohexane extraction, was 63%.

EXAMPLE 13

The method of Example 11 was repeated exactly, except that the reaction product of Example 3 was used. A product consisting of small while particles was obtained. The grafting efficiency was determined to be 70%.

EXAMPLE 14

Using the same generalized procedure described in Example 11, graft copolymers were made from all of the dehydrochlorinated poly(vinyl chloride) samples obtained in Examples 1–10. The grafted products were mixed with typical poly(vinyl chloride) stabilizers using a Brabender Plasti-Corder at 150° C. Compression-molded tensile sheets were prepared at 150° C. from the various compositions. The physical properties of each composition are listed in the following table.

TABLE

| Poly(vinyl chloride) Used for Grafting PVC I | 100% Modulus MPa | Tensile Strength MPa | Elongation % | Graves Tear kN/m | Shore "A" |
|---|---|---|---|---|---|
| (Example 11) | 5.79 | 6.69 | 240 | 35.7 | 90 |
| Example 1 | 7.52 | 10.5 | 235 | 49.2 | 91 |
| Example 2 | 7.26 | 10.0 | 235 | 48.6 | 89 |
| Example 3 | 6.93 | 9.9 | 235 | 48.6 | 90 |
| Example 4 | 8.53 | 11.3 | 260 | 51.1 | 96 |
| Example 5 | 7.65 | 9.5 | 235 | 44.5 | 94 |
| Example 6 | 8.23 | 11.5 | 255 | 52.5 | 96 |
| Example 7 | 7.39 | 10.1 | 230 | 45.2 | 92 |
| Example 8 | 7.16 | 9.9 | 300 | 53.0 | 94 |
| Example 9 | 8.97 | 11.9 | 230 | 52.5 | 96 |
| Example 10 | 8.16 | 8.63 | 140 | 43.0 | 95 |

Notes

1. U.S. Pat. No. 2,908,662, W. Rees.
2. U.S. Pat. No. 3,576,914, J. Donat.
3. Ostensson and Flodin, J. Macromol. Sci.-Chem., A12(2), 249-260 (1978).
4. D. Braun, Pure and Applied Chemistry, Vol. 26, #2, 173 (1971).
5. A. Wirsen and P. Flodin, J. Appl. Poly. Sci. 22, 3039 (1978).
6. I. K. Varma and K. K. Sharma, Die Angewandte Makromolekulare Chemie 78, 181 (1979).
7. Netherlands Patent Specification No. 7214020, Dow Chemical Co.
8. U.S. Patent No. 3,896,091, H. J. Fabris, H. Uelzmann and W. J. van Essen.
9. J. P. Roth, P. Rempp and J. Barrod, Jour. of Polymer Science, Part C, No. 4, 1347 (1963).
10. Z. Wolkober, Jour. of Polymer Science, Vol. 58, 1311 (1962).
11. U.S. Pat. No. 3,826,789, C. Yokokawa.

PVC I. Homopolyvinylchloride, inherent viscosity of 0.77, ASTM-D1755, porous.
PVC II. Homopolyvinylchloride, inherent viscosity of 0.57, ASTM-D1755, non-porous.
PVC III. Homopolyvinylchloride, inherent viscosity of 1.03, ASTM-D1755, porous.
PVC IV. Homopolyvinylchloride, inherent viscosity of 0.99, ASTM-D1755, non-porous.
PVC I, II, III and IV were all finely divided, free-radical, aqueous suspension polymerized vinylchloride polymers.

We claim:

1. The method which comprises dehydrochlorinating a vinychloride resin selected from the group consisting of homopolyvinylchloride, a copolymer of vinylchloride and vinyl acetate containing up to about 50% by weight of vinyl acetate and a copolymer of vinylchloride and vinylidene chloride containing up to about 50% by weight of vinylidene chloride and mixtures thereof as finely divided particles suspended in water, by heating said resin in said water at from about 50 to 150 psi and at a temperature of from about 150° to 180° C. for from about 1 to 2 hours to remove not over about 3% by weight, or from about 1 to 2% by weight, of chlorine from said resin, said water containing dissolved therein from about 0.1 to 5 parts by weight per 100 parts by weight of said resin of a material to prevent agglomeration of said resin during dehydrochlorination and being selected from the group consisting of a solid water soluble electrolyte and a weak base, where said electrolyte is selected from the group consisting of the lithium, sodium, potassium, magnesium, calcium, strontium and barium bromide, chloride and iodide salts and mixtures of the same, ammonium chloride and the sodium, potassium, lithium and magnesium acetates and where said weak base is selected from the group consisting of the lithium, sodium and potassium carbonates and phosphates and mixtures of the same, and, in said water, free radical aqueous graft suspension polymerizing on said dehydrochlorinated vinylchloride resin a monomer containing a polymerizable ethylenically unsaturated double bond and being selected from the group consisting of maides, nitriles, acrylates, alkacrylates, dienes and vinyl benzenes and mixtures thereof, said monomer being used in the amount of from about 50 to 200 parts by weight per 100 parts by weight of said dehydrochlorinated resin.

2. The method according to claim 1 wherein said monomer is a mixture of (A) an acrylate and/or an alkacrylate which can form a polymer having a Tg of not above about −20° C. and (B) a nitrile, the parts by weight ratio of (A) to (B) being from about 2:1 to 20:1.

3. The method according to claim 1 where said resin is a porous or non-porous homopolyvinylchloride.

4. The method according to claim 2 where said resin is a porous or non-porous homopolyvinylchloride.

5. The method according to claim 1 where a protective colloid is present in said free radical aqueous graft suspension polymerization step.

6. The method according to claim 2 where a protective colloid is present in said free radical aqueous graft suspension polymerization step.

7. The method according to claim 3 where a protective colloid is present in said free radical aqueous graft suspension polymerization step.

8. The method according to claim 4 where a protective colloid is present in said free radical aqueous graft suspension polymerization step.

* * * * *

UNITED STATES PATENT AND TRADEMARK OFFICE
CERTIFICATE OF CORRECTION

PATENT NO. : 4,423,193
DATED : December 27, 1983
INVENTOR(S) : Earl G. Melby et al It is certified that error appears in the above-identified patent and that said Letters Patent are hereby corrected as shown below:

Column 10, line 27, which reads: "maides" should read ---amides---.

Signed and Sealed this

Twenty-sixth Day of June 1984

[SEAL]

Attest:

GERALD J. MOSSINGHOFF

Attesting Officer

Commissioner of Patents and Trademarks